(12) United States Patent
Zhou et al.

(10) Patent No.: US 9,323,337 B2
(45) Date of Patent: Apr. 26, 2016

(54) SYSTEM AND METHOD FOR GESTURE RECOGNITION

(75) Inventors: Jie Zhou, Beijing (CN); Pu Cheng, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 50 days.

(21) Appl. No.: 13/996,692

(22) PCT Filed: Dec. 29, 2010

(86) PCT No.: PCT/CN2010/002191
§ 371 (c)(1),
(2), (4) Date: Jun. 21, 2013

(87) PCT Pub. No.: WO2012/088626
PCT Pub. Date: Jul. 5, 2012

(65) Prior Publication Data
US 2013/0294651 A1    Nov. 7, 2013

(51) Int. Cl.
*G06K 9/00* (2006.01)
*G06F 3/01* (2006.01)
*G06K 9/62* (2006.01)

(52) U.S. Cl.
CPC ............ *G06F 3/017* (2013.01); *G06K 9/00355* (2013.01); *G06K 9/6297* (2013.01)

(58) Field of Classification Search
USPC ......................................... 382/103, 159, 209
See application file for complete search history.

(56) References Cited

U.S. PATENT DOCUMENTS 5,454,043 A * 9/1995 Freeman ........................ 382/168
6,072,494 A * 6/2000 Nguyen ........................ 715/863
7,340,077 B2 * 3/2008 Gokturk et al. ............... 382/103
7,366,645 B2 * 4/2008 Ben-Arie et al. ................. 703/6
7,970,176 B2 * 6/2011 Kutliroff et al. .............. 382/103

(Continued)

FOREIGN PATENT DOCUMENTS

CN      101763515      6/2010

OTHER PUBLICATIONS

Lee, Hyeon, Kyu, Kim, Jin H. "An HMM-Based Threshold Model Approach for Gesture Recognition". IEEE Transactions on Pattern Analysis and Machine Intelligence. vol. 21 No. 10. Oct. 1999.*

(Continued)

*Primary Examiner* — Kim Vu
*Assistant Examiner* — Molly Delaney
(74) *Attorney, Agent, or Firm* — Robert D. Shedd; Vincent E. Duffy; Michael A. Pugel

(57) ABSTRACT

A system and method for gesture spotting and recognition are provided. Systems and methods are also provided employing Hidden Markov Models (HMM) and geometrical feature distributions of a hand trajectory of a user to achieve adaptive gesture recognition. The system and method provide for acquiring a sequence of input images of a specific user and recognizing a gesture of the specific user from the sequence of input images based on a gesture model and geometrical features extracted from a hand trajectory of the user. State transition points of the gesture model are detected and the geometrical features of the hand trajectory of the user are extracted based on the relative positions of the detected state transition points and a starting point of the gesture. The system and method further provide for adapting the gesture model and geometrical feature distribution for the specific user based on adaptation data.

22 Claims, 5 Drawing Sheets

(56) References Cited

U.S. PATENT DOCUMENTS

| | | | |
|---|---|---|---|
| 8,146,020 B2 * | 3/2012 | Clarkson | 715/863 |
| 8,605,941 B2 * | 12/2013 | Clarkson | 382/103 |
| 2002/0118880 A1 * | 8/2002 | Liu et al. | 382/199 |
| 2003/0208289 A1 * | 11/2003 | Ben-Arie | 700/61 |
| 2007/0127818 A1 * | 6/2007 | Thiesson et al. | 382/186 |
| 2009/0041354 A1 * | 2/2009 | Liu et al. | 382/187 |
| 2009/0052785 A1 * | 2/2009 | Shamaie | 382/209 |
| 2011/0306396 A1 * | 12/2011 | Flury et al. | 463/7 |
| 2012/0323521 A1 * | 12/2012 | De Foras et al. | 702/141 |

OTHER PUBLICATIONS

Leggetter, C.J., Woodland, P.C. "Maximum likelihood linear regression for speaker adaptation of continuous density hidden Markov models"Computer Speech and Language 1995.*

Alon, Jonathan, Athistos Vassilis, Yuan , Quan, Sclaroff, Stan. "A Unified Framework for Gesture Recognition and Spatiotemoral Gesture Segmentation". IEEE Transactions on Pattern Analysis and Machine Intelligence vol. 31 No. 9 Sep. 2009.*

International Search report dated Oct. 13, 2011.

* cited by examiner

SYSTEM AND METHOD FOR GESTURE RECOGNITION

TECHNICAL FIELD OF THE INVENTION

This application claims the benefit, under 35 U.S.C. §365 of International Application PCT/CN2010/002191, filed Dec. 29, 2010, which was published in accordance with PCT Article 21(2) on Jul. 5, 2012 in English.

BACKGROUND OF THE INVENTION

Gesture recognition is receiving more and more attention due to its potential use in sign language recognition, multimodal human computer interaction, virtual reality and robot control. Most gesture recognition methods match observed sequences of input images with training samples or a model. The input sequence is classified as the gesture class whose samples or model matches it best. Dynamic Time Warping (DTW), Continuous Dynamic Programming (CDP), Hidden Markov Model (HMM) and Conditional Random Field (CRF) are examples of gesture classifiers.

HMM matching is the most widely used technique for gesture recognition. However, this kind of method cannot utilize geometrical information of a hand's trajectory, which has proven effective for gesture recognition. In previous methods utilizing hand trajectory, the hand trajectory is taken as a whole, and some geometrical features which reflect the shape of the trajectory, such as the mean hand's position in the x and y axis, the skewness of x and y positions of the observed hands, and so on, are extracted as the input of the Bayesian classifier for recognition. However, this method cannot describe the hand gesture precisely.

For online gesture recognition, gesture spotting, i.e., determining the start and end points of the gesture, is a very important but difficult task. There are two types of approaches for gesture spotting: the direct approach and the indirect approach. In direct approaches, motion parameters, such as velocity, acceleration and trajectory curvature, are first computed, and abrupt changes of these parameters are found to identify candidate gesture boundaries. However, these methods are not accurate enough. The indirect approaches combine gesture spotting and gesture recognition. For the input sequence, the indirect approaches find intervals that give high recognition scores when matched with training samples or models, thus achieving temporal segmentation and recognition of gestures at the same time. However, these methods are usually time-consuming, and also some false detection of gestures may occur. One conventional approach proposes to use a pruning strategy to improve the accuracy as well as speed of the system. However, the method simply prunes based on the compatibility between a single point of the hand trajectory and a single model state. If the likelihood of the current observation is below a threshold, the match hypothesis will be pruned. The pruning classifier based on this simple strategy may easily over fit the training data.

Therefore, a need exists for techniques for more accurate and robust gesture spotting and recognition.

Furthermore, different users' gestures usually differ in speed, starting and ending points, angles of turning points and so on. Therefore, it's very meaningful to study how to adjust the classifiers to make a recognition system adapt to specific users.

Previously, only a few researchers have studied adaptive gesture recognition. One prior art technique achieves the adaptation of a gesture system through retraining the HMM models with new samples. However, this method loses the information of previous samples and is sensitive to noise data. Another technique uses an online version of the Baum-Welch method to realize online learning and updating of gesture classifiers, and develops a system that can learn a simple gesture online. However, the updating speed of this method is very slow.

Although there are only a few studies on adaptive gesture recognition, many methods for adaptive speech recognition have been published. One such study updates the HMM model through maximum a posteriori (MAP) parameter estimation. Through the use of prior distributions of parameters, less new data is needed to get robust parameter estimation and updating. The drawback of this method is that the new samples can only update the HMM model of its corresponding class, thus decreasing the updating speed. Maximum likelihood linear regression (MLLR) is widely used for adaptive speech recognition. It estimates a set of linear transformations of the model parameters using new samples, so that the model can better match the new samples after transformation. All model parameters can share a global linear transformation, or cluster into different groups, where each group of parameters share a same linear transformation. MLLR can overcome the drawback of MAP, and improve the model updating speed.

Therefore, a need exists for techniques to achieve adaptive gesture recognition so that a system employing such techniques can adapt to a specific user.

SUMMARY

A system and method for gesture spotting and recognition are provided. The system and method of the present disclosure achieve more accurate and robust gesture spotting and recognition by combining the detection of abrupt changes of motion parameters in a sequence of input images, Hidden Markov Model (HMM) matching and the extraction of trajectory geometrical features.

According to one aspect of the present disclosure, a method for spotting a gesture preformed by a user is provided, the method including acquiring a sequence of input images of a user, detecting abrupt changes of motion parameters in the sequence of input images as candidate starting points, matching the sequence of input images to a gesture model, detecting state transition points of the matched gesture model, extracting geometrical features of a hand trajectory of the user based on the detected state transition points and candidate starting points, determining an endpoint and gesture class of the gesture based on matched gesture model and the extracted geometrical features, and backtracking through the images from the determined endpoint of the gesture to determine an actual starting point of the gesture.

In another aspect of the present disclosure, a system for spotting a gesture preformed by a user includes an image capture device that acquires a sequence of input images of a user, an object detector and tracker that detects abrupt changes of motion parameters in the sequence of input images as candidate starting points, a model matcher that matches the sequence of input images to a gesture model, a transaction detector that detects state transition points of the matched gesture model, a feature extractor that extracts geometrical features of a hand trajectory of the user based on the detected state transition points and candidate starting points, and a gesture recognizer that determines an endpoint and gesture class of the gesture based on matched gesture model and the extracted geometrical features and backtracks through the images from the determined endpoint of the gesture to determine an actual starting point of the gesture.

A system and method for gesture recognition employing Hidden Markov Models (HMM) and geometrical feature distributions to achieve adaptive gesture recognition are provided. Different users' gestures usually differ in speed, starting and ending points, angles of turning points and so on. The present disclosure provides a method for the adaption of gesture recognition so that the system can adapt to specific users.

According to one aspect of the present disclosure, a method for recognizing a gesture performed by a user is provided, the method including acquiring a sequence of input images of a specific user and recognizing a gesture of the specific user from the sequence of input images based on a gesture model and geometrical features extracted from a hand trajectory of the user.

According to another aspect of the present disclosure, a system for recognizing a gesture performed by a user includes an image capture device that acquires a sequence of input images of a specific user and a gesture recognizer that recognizes a gesture of the specific user from the sequence of input images based on a gesture model and geometrical features extracted from a hand trajectory of the user.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
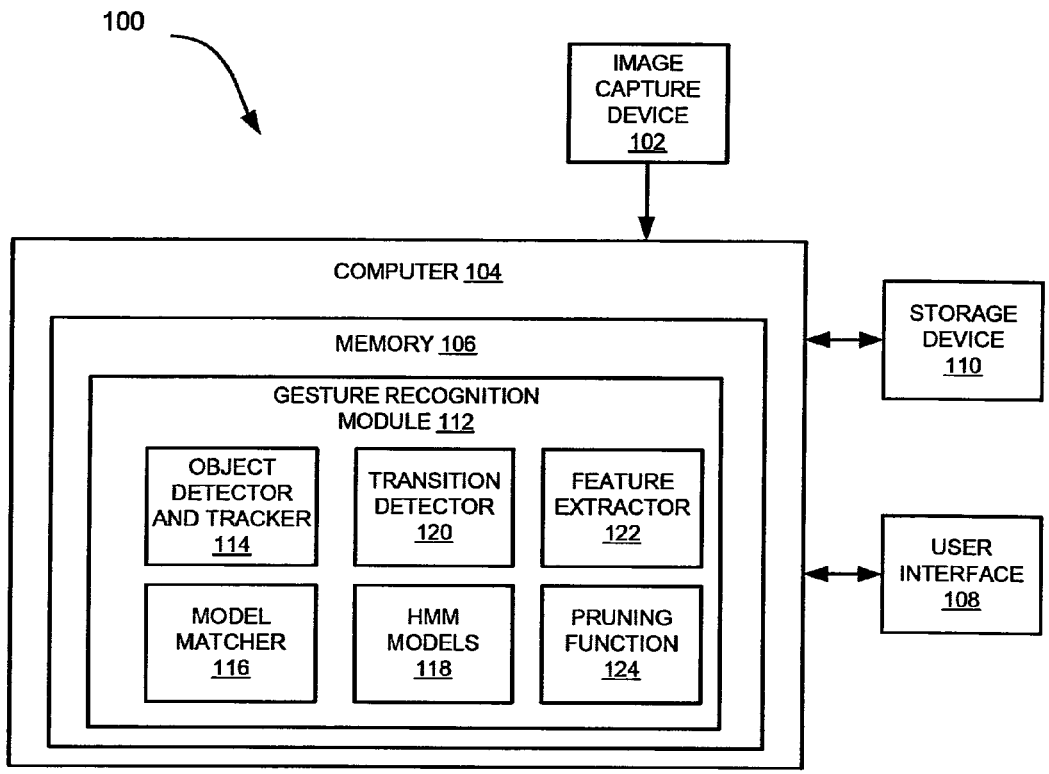
FIG. 1 is an exemplary illustration of a system for gesture spotting and recognition according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within the scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

A system and method to achieve gesture spotting and recognition combining the detection of abrupt changes of motion parameters in a sequence of input images, Hidden Markov Model (HMM) matching and the extraction of trajectory geometrical features are provided. Given an input sequence of captured video images, abrupt changes of motion parameters such as abnormal velocity and acceleration or severe trajectory curvatures will be detected as candidate starting/ending points of a gesture performed by a user. From these candidate starting points, the hand trajectory will be matched to the HMM model, i.e., a gesture model, of each gesture class. Geometrical features of the hand trajectory as well as a single observation classifier are used to prune match hypotheses.

For an input sequence, detected points of interest are matched with a HMM model and points are found where the states of HMM model change through a Viterbi algorithm or function. These points are called state transition points. The geometrical features are extracted from the gesture model based on the relative positions of state transition points and the starting point of the gesture. These geometrical features describe the hand gesture more precisely than the conventional methods. The state transition points usually correspond to the points where the trajectory begins to change, and extracting features based on the relative positions of these points and the starting point can reflect the characteristic of the gesture's shape very well, in contrast to conventional methods that take the hand trajectory as a whole and extract geometrical feature based on the statistical property of the hand trajectory.

Besides, as the extraction of the geometrical features is incorporated into the matching of HMM models, it is easy to utilize the extracted geometrical features for pruning, as well as to help recognize the type of the gesture. For example, if the likelihood of geometrical features extracted at a state transition point is below a threshold, this match hypothesis will be pruned. That is, if at some frame, it is determined that the cost of matching the frame to any state of a HHM model is too high, the system and method of the present disclosure concludes that the given model doesn't match the input sequence well and then it will stop matching subsequent frames to the states.

The incorporation of geometrical features for pruning is more accurate and robust than using only single observation. When a model matching score, which is computed based on a combination of HMM model and geometrical feature distributions between the hand trajectory and a gesture class, is bigger than a threshold, the gesture is segmented and recognized. This combination of detection of abrupt changes of motion parameters, HMM model matching and trajectory geometrical feature extraction outperforms the existing gesture spotting methods.

Referring now to the Figures, exemplary system components according to an embodiment of the present disclosure are shown in FIG. 1. An image capture device 102 may be provided for capturing images of a user performing a gesture. It is to be appreciated that the image capture device may be any known image capture device and may include a digital still camera, a digital video recorder, a web cam, etc. The captured images are input to a processing device 104, e.g., a computer. The computer is implemented on any of the various known computer platforms having hardware such as one or more central processing units (CPU), memory 106 such as random access memory (RAM) and/or read only memory (ROM) and input/output (I/O) user interface(s) 108 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In one embodiment, the software application program is tangibly embodied on a program storage device, which may be uploaded to and executed by any suitable machine such as processing device 104. In addition, various other peripheral devices may be connected to the computer platform by various interfaces and bus structures, such a parallel port, serial port or universal serial bus (USB). Other peripheral devices may include additional storage devices 110 and a printer (not shown).

A software program includes a gesture recognition module 112, also know as a gesture recognizer, stored in the memory 106 for recognizing gestures performed by a user in a captured sequence of images. The gesture recognition module 112 includes an object detector and tracker 114 that detects an object of interest, e.g., hands of a user, and tracks the object of interest through a sequence of captured images. A model matcher 116 is provided to match the detected and tracked object to at least one HMM model stored in a database of HMM models 118. Each gesture type has a HMM model associated to it. The input sequence is matched with all the HMM models corresponding to different gesture types to find which gesture type matches the input sequence best. For example, given an input sequence which is a sequence of the features from each frame of the captured video and a gesture model which is a sequence of states, the model matcher 116 finds the corresponding relation between each frame and each state. The model matcher 116 may employ the Viterbi algorithm or function, a forward algorithm or function, a forward-backward algorithm or function, etc. to realize the matching.

The gesture recognition module 112 further includes a transition detector 120 for detecting points where the states of a HMM model change. These points are called state transition points and are found or detected through a Viterbi algorithm or function, among others, employed by the transition detector 120. Geometrical features are extracted based on the relative positions of state transition points and the starting point of the gesture by a feature extractor 122.

The gesture recognition module 112 further includes a pruning algorithm or function 124, also known as a pruner, which is used to reduce the number of calculations performed to find the matching HMM model thereby speeding up the gesture spotting and detection process. For example, given an input sequence which is a sequence of the features from each frame of captured video and a gesture model which is a sequence of states, the corresponding relation between each frame and each state should be found. However, if at some frame, the pruning algorithm or function 124 finds that the cost of matching the frame to any state is too high, then the pruning algorithm or function 124 will stop matching subsequent frames to the states and conclude that the given model doesn't match the input sequence well.

Additionally, the gesture recognition module 112 includes a maximum likelihood linear regression (MLLR) function which is used to adapt the HMM models and incrementally learn the geometrical feature distributions of a specific user for each gesture class. Through simultaneously updating the HMM models and geometrical feature distributions, the gesture recognition system can adapt to the user quickly.

Figure 2:
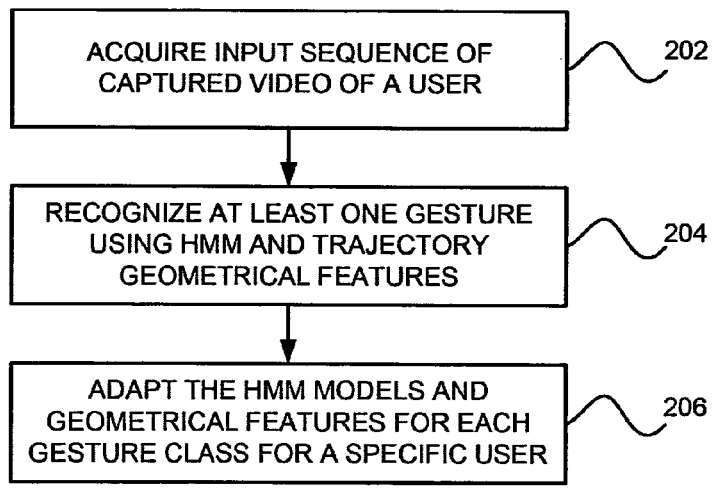
FIG. 2 is a flow diagram of an exemplary method for gesture recognition according to an aspect of the present disclosure.

FIG. 2 is a flow diagram of an exemplary method for gesture recognition according to an aspect of the present disclosure. Initially, the processing device 104 acquires a sequence of input images captured by the image capture device 102 (step 202). The gesture recognition module 112 then performs gesture recognition using HMM models and geometrical features (step 204). Step 204 will be further described below in relation to FIGS. 3-4. In step 206, the gesture recognition module 112 will adapt the HMM models and the geometrical feature distributions for each gesture class for the specific user. Step 206 will be further described below in relation to FIGS. 5-6.

Figure 3:
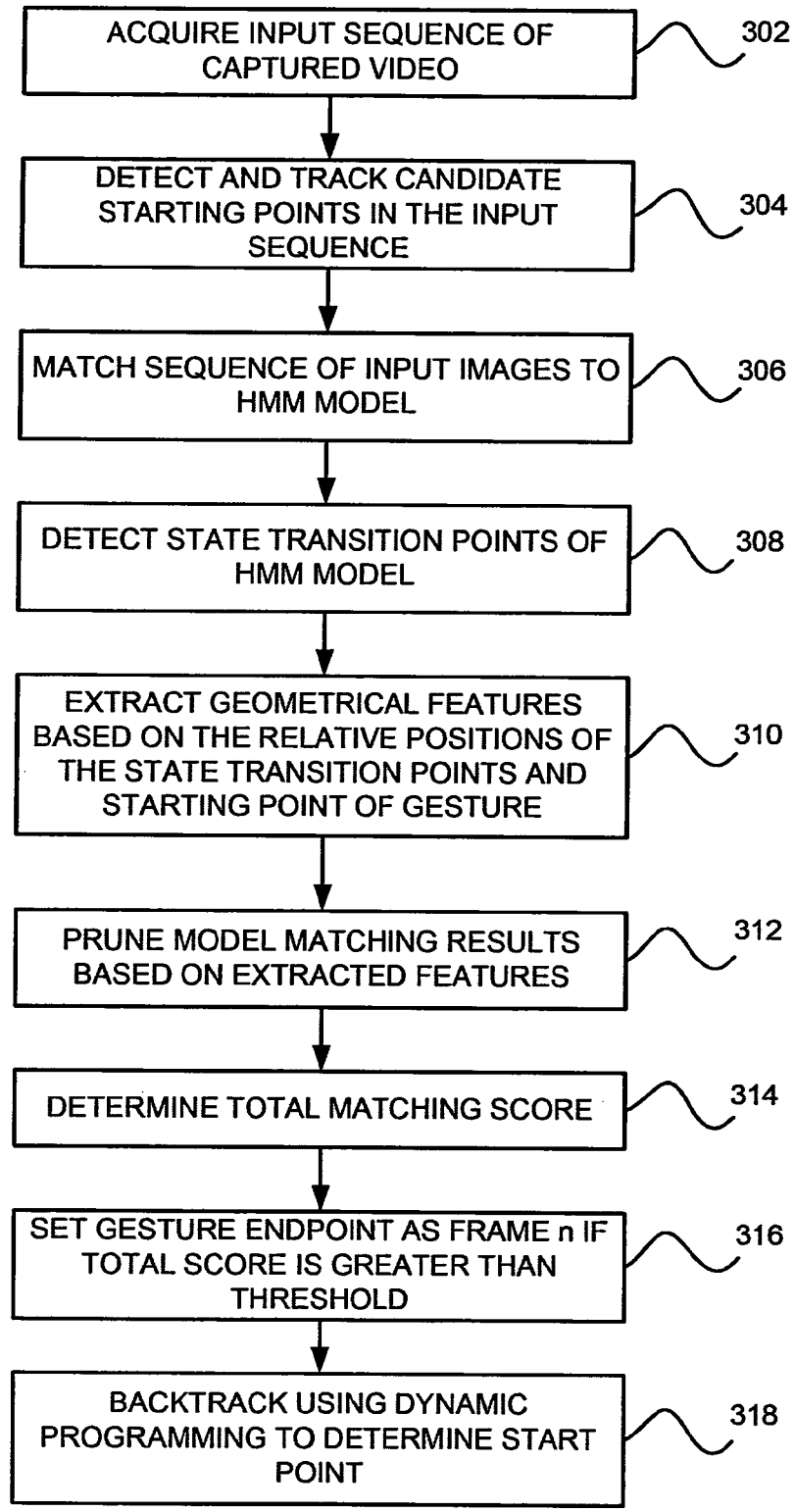
FIG. 3 is a flow diagram of an exemplary method for gesture spotting and recognition according to an aspect of the present disclosure.

FIG. 3 is a flow diagram of an exemplary method for gesture spotting and recognition according to an aspect of the present disclosure.

1.1. Candidate Starting Points Detection

Initially, in step 302, an input sequence of images is captured by the image capture device 102. In step 304, the object detector and tracker 114 detects candidate starting points in the input sequence and tracks the candidate starting points throughout the sequence. Features such as hand position and velocity are used to represent the hands detected in each frame of the input sequence. These features are normalized by the position and width of the face of the user.

Like direct gesture spotting approaches, candidate starting points are detected as the abrupt changes of motion parameters in the input sequence. The points that have abnormal velocities or severe trajectory curvatures are detected as the candidate starting points. There are usually many false positive detections using this method. Direct gesture spotting methods, which use these points as the gesture boundaries, are not very accurate and robust. The method of the present disclosure uses a different strategy. The hand trajectory is matched to the HMM model of each gesture class from these candidate starting points, so the method can combine the advantages of the direct and indirect gesture spotting methods.

1.2. HMM Model Matching

In step, 306, the sequence of input images are matched to a HMM model 118 via the model matcher 116, as will be described below.

Let $Q=\{Q_1, Q_2, \ldots\}$ be a continuous sequence of feature vectors, where $Q_i$ is a feature vector extracted from the input frame j of the input images. Features such as hand position and velocity are used to represent the hands detected in each frame. These features are normalized by the position and width of the face of the user performing the gesture. Let $M^g=\{M_0^g, \ldots, M_m^g\}$ be a left-right HMM model with m+1 states for gesture g. Each state $M_i^g$ is associated with a Gaussian observation density which gives the likelihood of each observation vector $Q_i$. The Baum-Welch algorithm or function will be used to train the HMM model. The number of states for each model is specified according to the trajectory length, as typically done with the Baum-Welch algorithm or function. The transition probabilities are fixed to simplify the learning task, i.e., at every transition, the model is equally likely to move to the next state or to remain at the same state.

Denote $a_{k,i}$ as the transition probability of transitioning from state k to state i, and $p(Q_j|M_i^g)$ as the likelihood of the feature vector $Q_j$ when matching with the model state $M_i^g$. Let C be the candidate starting point set detected using method described in section 1.1. $M_0^g$ is a special state where $$p(Q_j \mid M_0^g) = \begin{cases} 1, & \text{if } Q_j \in C \\ 0, & \text{if } Q_j \notin C \end{cases} \quad (1)$$

Thus, the HMM model matching begins only at these candidate starting points. Denote $V(i,j)$ as the maximum probability when matching the first j input feature vectors $(Q_1, \ldots, Q_j)$ with the first i+1 model states $(M_0^g, \ldots, M_i^g)$. Then we have $$V(i, j) = p(Q_j \mid M_i^g) \cdot \max_k (a_{k,i} V(k, j-1)). \quad (2)$$

Let the maximum matching score between $(Q_1, \ldots, Q_j)$ and $(M_0^g, \ldots, M_i^g)$, $S_H(i,j)$, be the logarithm of $V(i,j)$:

$$S_H(i,j) = \log V(i,j). \quad (3)$$

Based on the property in Eq.2, Dynamic Programming (DP) is used to compute the maximum matching score efficiently. DP is implemented using a table, indexed by (i,j). When a new feature vector $Q_n$ is extracted from the input frame, the slice of the table corresponding to frame n is computed, and two pieces of information are stored at cell (i, n): 1) the value of $S_H(i,n)$, for i=0, . . . , m, and 2) the predecessor k used to minimize Eq.2, where $S_H(i,n)$ is the score of the optimal matching between the model and the input sequence ending at frame i and k is the state to which the previous frame is corresponding in the optimal matching. $S_H(m,n)$ corresponds to the optimal alignment between the model and the input sequence ending at frame n. The optimal Dynamic Programming (DP) path, i.e., the optimal state sequence of HMM model, can be obtained using backtracking. Existing indirect methods usually use $S_H(m,n)$ to achieve gesture spotting, i.e., if $S_H(m,n)$ is bigger than a threshold, the gesture endpoint is detected as frame n, and the gesture start point can be found by backtracking the optimal DP path.

To improve the speed and accuracy of the system, conventional systems use a pruning strategy, where they prune based on the likelihood of the current observation: If $p(Q_i|M_i^g) \leq \tau(i)$, where $\tau(i)$ is a threshold for model state i and is learned from the training data, the cell (i,j) will be pruned out, and all path going through it will be rejected. However, this simple pruning strategy is not accurate enough.

1.3. Geometrical Feature Extraction

Figure 4:
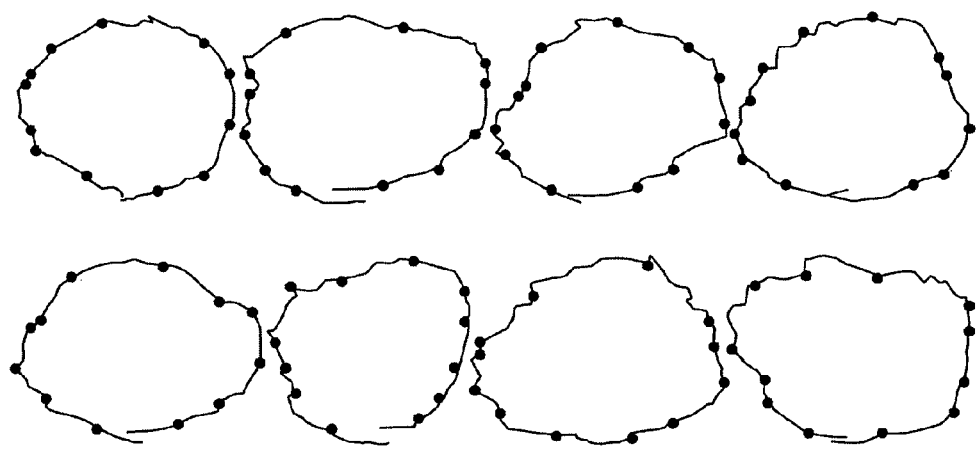
FIG. 4 illustrates examples of state transition points extracted from a segmented trajectory "0" performed by a user.

In the method of the present disclosure, the extraction of geometrical features are incorporated into the HMM model matching procedure. For an input sequence, the state sequence of HMM model is determined in step 308, via the transition detector 120. The points where the states of HMM change are detected. FIG. 4 gives some examples of state transition points extracted from a segmented trajectory "0", the trajectory being performed by a user and captured by the image capture device 102. The black points are the state transition points. It can be seen that the positions of the state transition points are similar for all the trajectories, so the geometrical features are extracted based on the relative positions of state transition points and the starting point of the gesture, via feature extractor 122 in step 310 as will be described below.

Denote the starting point of the gesture as $(x_0, y_0)$, the geometrical features extracted at transition point $(x_t, y_t)$ include: $x_t - x_0$, $y_t - y_0$, and $$\tan^{-1} \frac{y_t - y_0}{x_t - x_0}.$$

These simple features can well describe the geometrical information of hand trajectories.

For each gesture class, the HMM model associated with it is used to extract the geometrical features of its training samples. The geometrical features are assumed to obey Gaussian distributions. The distributions of geometrical features are learned from the training samples. Then, each gesture class is associated with a HMM model and its geometrical feature distribution. Denote the geometrical feature distributions of gesture g as $F^g=\{F_1^g, \ldots, F_m^g\}$, where m is related to the state number of $M^g$, and $F_i^g$ is the distribution of geometrical features extracted at point where the state of HMM model changes from i-1 to i. As the extraction of the geometrical features are incorporated into the HMM model matching procedure, it's easy to utilize the geometrical features for pruning. For example, if a frame F is a state transition frame, the geometrical features are extracted based on frame F. If the probability of the extracted geometrical feature is lower than a threshold, this matching will be pruned out, i.e., matching subsequent frames to the states of the model will be stopped by the model matcher 116 and at least one second gesture model to match will be selected. The pruning procedure will now be described in relation to Eq.(4) below.

In step 312, the pruning function or pruner 124 will prune out the cell (i,j) if the following condition is satisfied:

$$(i \neq \mathrm{pre}(i) \text{ and } F_i^g(G_j) \leq t(i)) \text{ or } p(Q_j|M_i^g) \leq \tau(i) \quad (4)$$

where pre(i) is the predecessor of state i during HMM model matching, $G_j$ is the geometrical features extracted at point j, t(i) is a threshold that learns from the training samples, and $p(Q_i|M_i^g)$ and $\tau(i)$ are defined as in Section 1.2.

In step 314, the total matching score between $(Q_1, \ldots, Q_n)$ and $(M_0^g, \ldots, M_m^g)$ is computed as follows by the gesture recognition module 112:

$$S(m, n) = \alpha \times S_H(m, n) + (1 - \alpha) \times \left( \sum_{i=1}^{m} \log F_i^g(G_{j(i)}) \right) \quad (5)$$

where $\alpha$ is a coefficient, $S_H(m, n)$ is the HMM matching score, and $G_{j(i)}$ is the geometrical features extracted at the point where the HMM state changes from i-1 to i. The temporal segmentation of gesture is achieved like the indirect methods, i.e., if s(m,n) is bigger than a threshold, the gesture endpoint is detected as frame n (step 216), and the gesture start point can be found by backtracking the optimal DP path (step 218). By using Expr.4 and Eq. 5, the method can combine HMM and geometrical features of the hand trajectory for gesture spotting and recognition, thus improving the accuracy of the system.

In another embodiment, a system and method for gesture recognition employing Hidden Markov Models (HMM) and geometrical feature distributions to achieve adaptive gesture recognition are provided. The system and method of the present disclosure combine HMM models and geometrical features of a user's hand trajectory for gesture recognition. For an input sequence, a detected object of interest, e.g., a hand, is tracked and matched with a HMM model. Points where the states of HMM model change are found through a Viterbi algorithm or function, a forward algorithm or function, a forward-backward algorithm or function, etc. These points are called state transition points. Geometrical features are extracted based on the relative positions of the state transition points and the starting point of the gesture. Given adaptation data, i.e., the gestures a specific user performed, a maximum likelihood linear regression (MLLR) method is used to adapt the HMM models and incrementally learn the geometrical feature distributions for each gesture class for the specific user. Through simultaneously updating the HMM models and geometrical feature distributions, the gesture recognition system can adapt to the specific user quickly.

2.1. Gesture Recognition Combining HMM and Trajectory Geometrical Features

Figure 5:
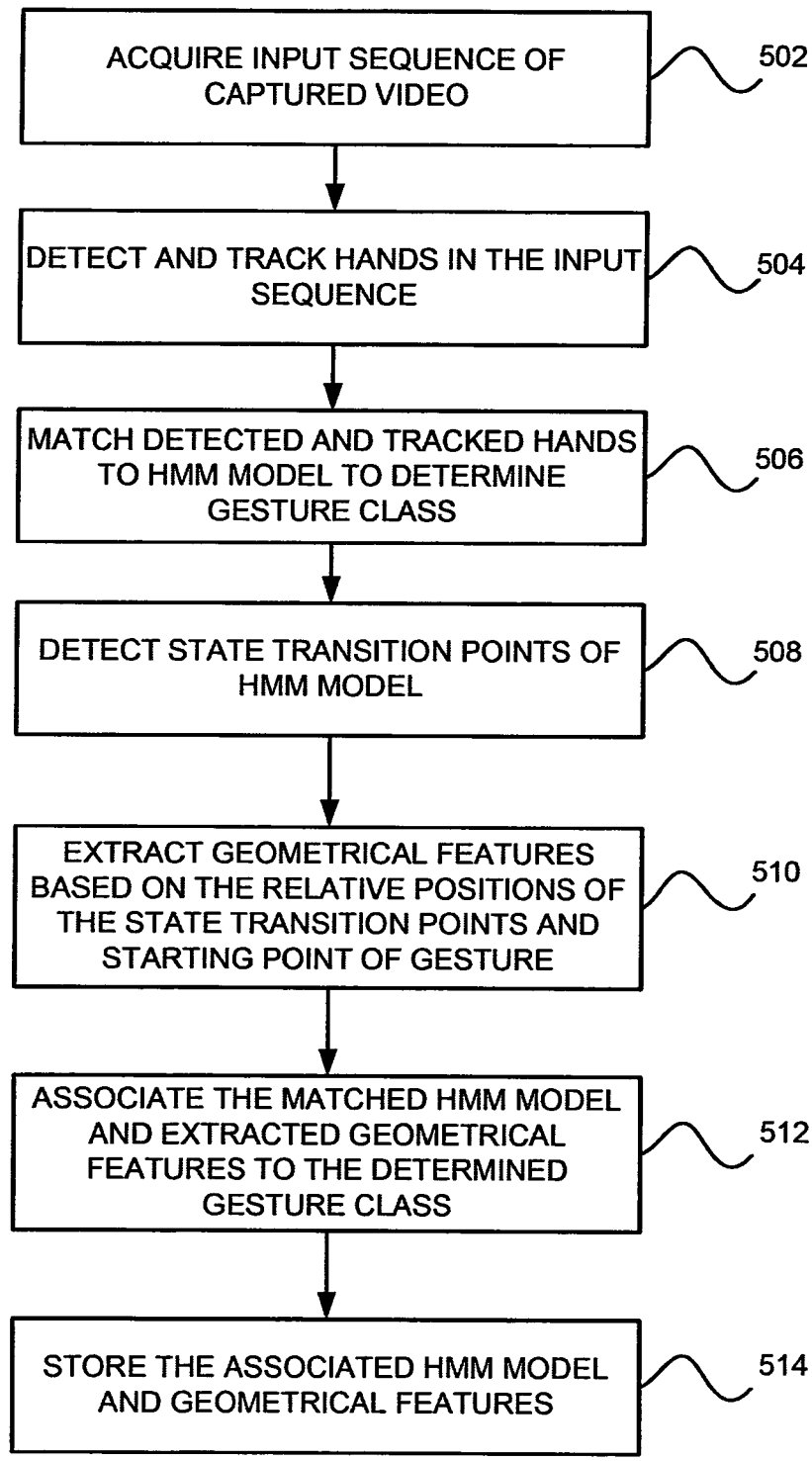
FIG. 5 is a flow diagram of an exemplary method for training a gesture recognition system using Hidden Markov Models (HMM) and geometrical feature distributions according to an aspect of the present disclosure.

Referring to FIG. 5, a flow diagram of an exemplary method for training a gesture recognition system using Hidden Markov Models (HMM) and geometrical feature distributions according to an aspect of the present disclosure is illustrated.

Initially, in step 502, an input sequence of images is acquired or captured by the image capture device 102. In step 504, the object detector and tracker 114 detects an object of interest, e.g., a user's hand, in the input sequence and tracks the object throughout the sequence. Features such as hand position and velocity are used to represent the hands detected in each frame of the input sequence. These features are normalized by the position and width of the face of the user. Given the face center position (xf,yf), the width of the face w, and the hand position (xh, yh) on the frame of an image, the normalized hand position is xhn=(xh−xf)/w,yhn=(yh−yf)/w, i.e., the absolute coordinates are changed into relative coordinates with respect to face center.

A left-right HMM model with Gaussian observation densities is used to match the detected hands to a gesture model and determine a gesture class, in step 506. For example, given an input sequence which is a sequence of the features from each frame of the captured video and a gesture model which is a sequence of states, the model matcher 116 finds the corresponding relation between each frame and each state via, for example, the Viterbi algorithm or function, a forward algorithm or function or a forward-backward algorithm or function.

Next, in step 508, for the input sequence, the state sequence of the matched HMM model is detected by the transition detector 120 using a Viterbi algorithm or function. The points where the states of HMM model change are detected. In step 510, the geometrical features are extracted based on the relative positions of state transition points and the starting point of the gesture via the feature extractor 122. Denote the starting point of the gesture as $(x_0,y_0)$, the geometrical features extracted at transition point $(x_t,y_t)$ include: $x_t-x_0$, $y_t-y_0$, and $$\tan^{-1} \frac{y_t - y_0}{x_t - x_0}.$$

Given an input sequence, the features extracted at all the state transition points form the geometrical features of the input sequence. These simple features can well describe the geometrical information of hand trajectories.

For each gesture class, a left-right HMM model is trained, and this HMM model is used to extract the geometrical features of its training samples. The geometrical features are assumed to obey Gaussian distributions. The distributions of geometrical features are learned from the training samples. Then each gesture class is associated with a HMM model and its geometrical feature distribution, in step 512, and the associated HMM model and geometrical feature distribution are stored, step 514.

Denote the HMM model and geometrical feature distribution associated with the ith gesture class are $\lambda_i$ and $q_i$, respectively. To match a segmented hand trajectory $O=\{O_1, O_2, \ldots, O_T\}$ (i.e., the detected and tracked object) with the ith gesture class, the geometrical features $G=\{G_1, G_2, \ldots G_N\}$ are extracted using $\lambda_i$. The match score is computed by the gesture recognition module 112 as follows:

$$S = \alpha \times \log p(O|\lambda_i) + (1-\alpha) \times \log q_i(G) \quad (6)$$

where α is a coefficient and $p(O|\lambda_i)$ is the probability of the hand trajectory O given HMM model $\lambda_i$. $p(O|\lambda_i)$ can be computed using Forward-Backward algorithm or function. The input hand trajectory will be classified as the gesture class whose match score is the highest. Therefore, using Eq. 6, the system and method of the present disclosure can combine HMM models and geometrical features of the user's hand trajectory (i.e., the detected and tracked object) for gesture recognition.

2.2. The Adaptation of Gesture Recognition

Figure 6:
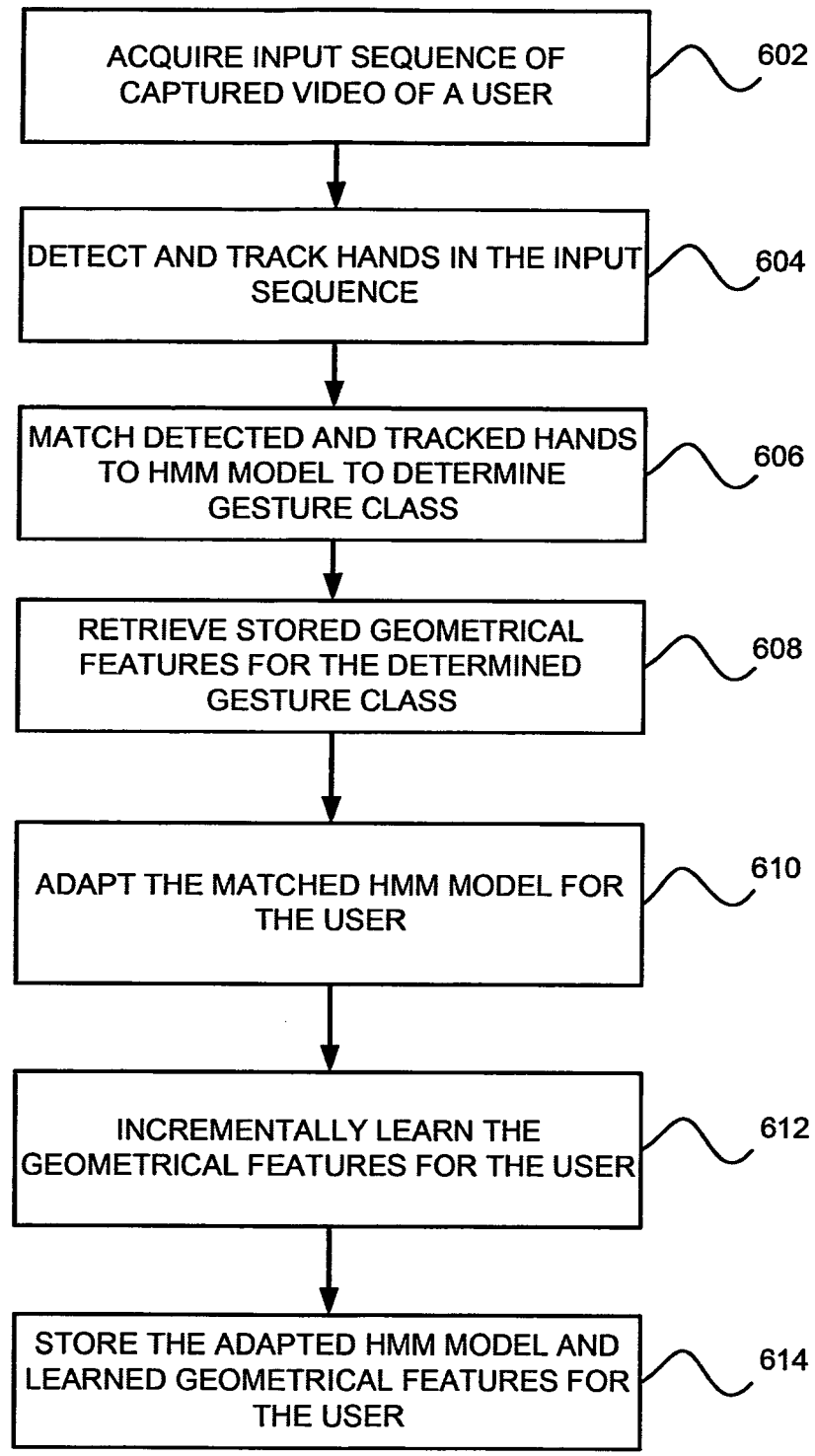
FIG. 6 is a flow diagram of an exemplary method for adapting a gesture recognition system to a specific user according to an aspect of the present disclosure.

FIG. 6 is a flow diagram of an exemplary method for adapting a gesture recognition system to a specific user according to an aspect of the present disclosure. Given adaptation data (i.e., the gestures a specific user performed), the system and method of the present disclosure employ a maximum likelihood linear regression (MLLR) function to adapt the HMM models and incrementally learn the geometrical feature distributions for each gesture class.

Initially, in step 602, an input sequence of images is captured by the image capture device 102. In step 604, the object detector and tracker 114 detects an object of interest in the input sequence and tracks the object throughout the sequence. A left-right HMM model with Gaussian observation densities is used to model a gesture class, in step 606. In step 608, the geometrical feature distributions associated to the determined gesture class are retrieved.

Next, in step 610, the HMM model is adapted for the specific user using the maximum likelihood linear regression (MLLR) function. Maximum likelihood linear regression (MLLR) is widely used for adaptive speech recognition. It estimates a set of linear transformations of the model parameters using new samples, so that the model can better match the new samples after transformation. In the standard MLLR approach, the mean vectors of the Gaussian densities are updated according to $$\bar{\mu} = W\xi \qquad (7)$$

where W is an n×(n+1) matrix (and n is the dimensionality of the observation feature vector) and ξ is the extended mean vector: $\xi^T = [1, \mu_1, \ldots, \mu_n]$. Assume the adaptation data, O, is a series of T observations: $O = o_1 \ldots o_T$. To compute W in Eq. 7, the objective function to be maximized is the likelihood of generating the adaptation data:

$$F(O|\lambda) = \sum_\theta F(O, \theta|\lambda) \qquad (8)$$

where θ is the possible state sequence generating O, λ is the set of model parameters. By maximizing the auxiliary function $$Q(\lambda, \bar{\lambda}) = \sum_\theta F(O, \theta|\lambda)\log F(O, \theta|\bar{\lambda}) \qquad (9)$$

where λ is the current set of model parameters, and $\bar{\lambda}$ is the re-estimated set of model parameters, the objective function in Eq. 8 is also maximized. Maximizing Eq. 9 with respect to W can be solved with the Expectation-Maximization (EM) algorithm or function.

Then, in step 612, the system incrementally learns the geometrical feature distributions for the user by re-estimating a mean and covariance matrix of the geometrical feature distribution over a predetermined number of adaptation samples. Denote current geometrical feature distributions of gesture g as $F^g\{F_1^g, \ldots, F_m^g\}$, where $F_i^g$ is the distribution of geometrical features extracted at the point where the state of the HMM model changes from i−1 to i. Assume the mean and the covariance matrix of $F_i^g$ are $\mu_i^g$ and $\Sigma_i^g$, respectively. Given the adaptation data of gesture g, geometrical features are extracted from the data, and let the geometrical features extracted at points of the adaptation data where the state changes from i−1 to i form the set $X = \{x_1, \ldots, x_k\}$, where $x_i$ is the features extracted from the ith adaptation sample of gesture g, and k is the number of adaptation samples for gesture g. Then, the geometrical feature distribution is updated as follows:

$$\begin{cases} \overline{\mu_i^g} = \beta \cdot \mu_i^g + (1-\beta) \cdot \dfrac{\sum_{l=1}^{k} x_l}{k} \\ \overline{\sum_i^g} = \beta \cdot \sum_i^g + (1-\beta) \cdot \dfrac{\sum_{l=1}^{k}[[(x]]_l - \overline{\mu_i^g})(x]_l - \overline{\mu_i^g})^T}{(k-1)} \end{cases} \qquad (10)$$

where $\overline{\mu_i^g}$ and $\overline{\Sigma_i^g}$ are the re-estimated mean and covariance matrix of $F_i^g$ respectively.

Through simultaneously updating the HMM models and geometrical feature distributions, the gesture recognition system can adapt to the user quickly. The adapted HMM model and learned geometrical feature distributions are then stored for the specific user in storage device 110 (step 614).

A system and method for gesture recognition has been described. Gesture models (e.g., HMM models) and geometrical feature distributions are used to perform the gesture recognition. Based on adaptation data (i.e., the gestures a specific user performed), both the HMM models and geometrical feature distributions are updated. In this manner, the system can adapt to the specific user.

Although embodiments which incorporate the teachings of the present disclosure have been shown and described in detail herein, those skilled in the art can readily devise many other varied embodiments that still incorporate these teachings. Having described preferred embodiments for a system and method for gesture recognition (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method for recognizing a gesture performed by a user, the method comprising:
   acquiring a sequence of input images of a specific user; and
   recognizing a gesture of the specific user from the sequence of input images based on a gesture model and geometrical features extracted from a hand trajectory of the user, the recognizing further comprising:
   detecting abrupt changes of motion parameters of at least one object in each frame of the sequence of input images as candidate starting points of the gesture;
   tracking the candidate starting points though the sequence of images;
   matching the candidate starting points of the sequence of input images to at least one first gesture model;
   detecting state transition points of the at least one first matched gesture model;

extracting geometrical features of a hand trajectory from the sequence of input images based on relative locations of the detected state transition points of the at least one first matched gesture model and a starting point of the gesture;

computing a gesture model matching score for each frame of the sequence of input images for the candidate starting points for each gesture class using the at least one first gesture model and extracted geometrical features;

pruning the at least one first matched gesture model based on the gesture model matching score of at least one frame of the sequence of input images; and classifying the gesture as the gesture class with the highest match score.

2. The method as in claim 1, wherein the at least one first gesture model is a Hidden Markov Model (HMM).

3. The method as in claim 1, wherein the recognizing step further comprises:

determining an endpoint of the gesture based on the at least one first matched gesture model and the extracted geometrical features; and backtracking through the images from the determined endpoint of the gesture to determine an actual starting point of the gesture.

4. The method as in claim 3, wherein the determining the endpoint of the gesture further comprises:

selecting the frame having the gesture model matching score greater than a first predetermined threshold as the frame containing the endpoint of the gesture.

5. The method as in claim 4, further comprising selecting at least one second gesture model for matching if a probability of the extracted geometrical feature appearing in a frame is below a second predetermined threshold.

6. The method as in claim 5, wherein the second predetermined threshold is based on the determined gesture class.

7. The method as in claim 3, wherein the backtracking through the images is performed by a Dynamic Programming (DP) function.

8. The method as in claim 1, further comprising adapting the at least one first gesture model and geometrical feature distribution for the specific user based on gestures performed by the specific user.

9. The method as in claim 8, wherein a maximum likelihood linear regression (MLLR) function is employed to update previously presented gesture model with gesture samples from the specific user.

10. The method as in claim 9, further comprising incrementally learning the geometrical feature distribution for the specific user by re-estimating a mean and covariance matrix of the geometrical feature distribution over a predetermined number of adaptation samples.

11. The method as in claim 10, further comprising storing the updated gesture model and learned geometrical feature distribution for the specific user.

12. A system for recognizing a gesture performed by a user comprising:

an image capture device that acquires a sequence of input images of a specific user; and a processing device that recognizes a gesture of the specific user from the sequence of input images based on a gesture model and geometrical features extracted from a hand trajectory of the user, the processing device further detects abrupt changes of motion parameters of at least one object in each frame of the sequence of input images as candidate starting points of the gesture, tracks the candidate starting points though the sequence of images, matches the candidate starting points of the sequence of input images to at least one first gesture model, detects state transition points of the at least one first matched gesture model, extracts geometrical features of a hand trajectory from the sequence of input images based on relative locations of the detected state transition points of the at least one first matched gesture model and a starting point of the gesture, computes a gesture model matching score for each frame of the sequence of input images for the candidate starting points for each gesture class using the at least one first gesture model and extracted geometrical features, prunes the at least one first gesture model based on the gesture model matching score of at least one frame of the sequence of input images and classifies the gesture as the gesture class with the highest match score.

13. The system as in claim 12, wherein the at least one first gesture model is a Hidden Markov Model (HMM).

14. A system as in claim 12, wherein the processing device determines an endpoint of the gesture based on the at least one first matched gesture model and the extracted geometrical features and backtracks through the images from the determined endpoint of the gesture to determine an actual starting point of the gesture.

15. The system as in claim 14, wherein the processing device is further configured for selecting the frame having the gesture model matching score greater than a first predetermined threshold as the frame containing the endpoint of the gesture.

16. The system as in claim 15, wherein the processing device is further configured for selecting at least one second gesture model for matching if a probability of the extracted geometrical feature appearing in a frame is below a second predetermined threshold.

17. The system as in claim 16, wherein the second predetermined threshold is based on the determined gesture class.

18. The system as in claim 14, wherein the processing device includes a Dynamic Programming (DP) function for backtracking through the images.

19. The system as in claim 12, wherein the processing device is further configured for adapting the at least one first gesture model and geometrical feature distribution for the specific user based on gestures performed by the specific user.

20. The system as in claim 19, wherein the processing device includes a maximum likelihood linear regression (MLLR) function to update the at least one first gesture model with gesture samples from the specific user.

21. The system as in claim 20, wherein the processing device is further configured for incrementally learning the geometrical feature distribution for the specific user by re-estimating a mean and covariance matrix of the geometrical feature distribution over a predetermined number of adaptation samples.

22. The system as in claim 21, wherein the processing device is further configured for storing the updated gesture model and learned geometrical feature distribution for the specific user in storage device.

* * * * *